# 3,156,694
TRIFLUOROACETAMIDE AND METHANE-SULFONAMIDE COMPOUNDS

Horace A. De Wald, Ann Arbor, Mich., assignor to Parke, Davis & Company, Detroit, Mich., a corporation of Michigan
No Drawing. Filed Mar. 11, 1963, Ser. No. 264,079
5 Claims. (Cl. 260—294.8)

The present invention relates to amide compounds. More particularly, it relates to substituted trifluoroacetamide compounds and substituted methanesulfonamide compounds which can be represented in free base form by the formula

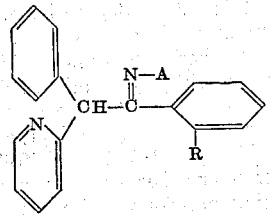

and to methods for their production; where R represents lower alkyl or halogen and A represents trifluoroacetyl (CF₃CO—) or methanesulfonyl (CH₃SO₂—). In the compounds of the invention, the preferred lower alkyl group is methyl and the preferred halogen is chlorine.

Although in the foregoing general formula the compounds of the invention are represented as having the structure of an alkylidene derivative in which two valences of a single carbon atom are attached to the amido nitrogen, this is only one of the equivalent tautomeric forms in which these compounds can exist. The facile interconversion between the alkylidene form and other tautomeric forms is illustrated by the following equation.

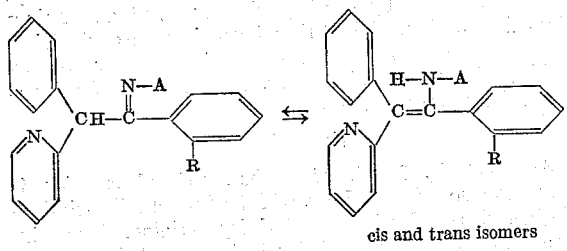

cis and trans isomers

In any particular compound of the invention, one of the indicated tautomeric forms may be favored by such factors as acidic or basic conditions or solvent. For reasons of convenience, the compounds of the invention are consistently formulated and named as having the alkylidene structure but because of the equilibrium state which can exist among the tautomeric forms, it will be appreciated that the alkylidene structure includes the tautomers as well.

In accordance with the invention, compounds of the formula

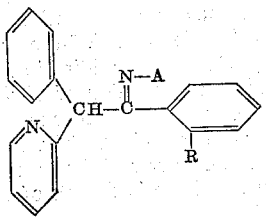

are produced by reacting a compound which can be represented by the formula

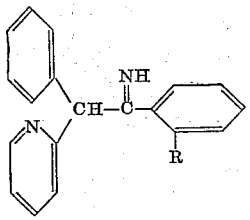

or a reactive metal derivative thereof with a reactive derivative or trifluoroacetic acid or a reactive derivative of methanesulfonic acid, whereby acylation occurs with introduction of the trifluoroacetyl group or the methanesulfonyl group; where R and A are as defined before. Some examples of suitable reactive derivatives of the aforementioned acids are the acid halides, the acid anhydrides, and activated esters such as the cyanomethyl ester. In the case where the starting material to be acylated is a reactive metal derivative of the imine, it is preferably the lithium derivative or other alkali metal derivative which can be formed in situ or added to the reaction mixture as such. The substance being acylated, although for convenience represented in the foregoing formula as having an imine structure, can also exist in equivalent tautomeric forms, the cis enamine and the trans enamine. In the process of the invention the starting material can of course be used as an equivalent tautomeric form. At least an equimolar amount and preferably up to a moderate excess of the acylating agent is employed. The reaction can be carried out in any of a variety of solvents such as pyridine, chloroform, benzene, or ethyl acetate. The reaction proceeds most satisfactorily in an anhydrous medium under slightly basic conditions and when using a neutral solvent a teritary base such as triethylamine is preferably added. The reaction proceeds readily at room temperature or below and is usually carried out in the range of 0–25° C., most commonly at from 0–10° C. Under these conditions, the acylation is normally substantially complete within 1 to 24 hours.

The imine compounds employed as starting materials in the process of the invention can be prepared by reacting a benzonitrile compound of the formula

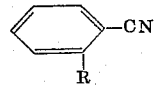

with a reactive metal derivative such as the lithium derivative of 2-benzylpyridine under anhydrous conditions, followed by mild hydrolysis of the reaction mixture, as with water or ammonium chloride solution; where R is as defined before. Where a reactive metal derivative of the imine, such as the lithium derivative, is desired as a starting material, it can be obtained by reaction of the imine with a strong base or produced in situ by omitting the hydrolysis step following the reaction of the benzonitrile compound with the reactive metal derivative of 2-benzylpyridine.

The compounds of the invention are preferably produced and used in the forms of their free bases. Alternatively, by pH adjustment or by reaction of a free base with an acid, preferably under anhydrous conditions, the compounds of the invention can be produced and used in acid-addition salt form. The acid-addition salt forms are comparatively unstable because they tend to undergo hydrolysis or to revert to the free bases but in other respects they are equivalent to the free bases for the purposes of the invention.

The compounds of the invention have hormonal properties and are of value as pharmacological agents. They are ovulation inhibitors and can be used as anti-fertility agents. The invention also provides compounds useful as hypocholesteremic agents, and in particular those derivatives containing a trifluoroacetyl group are of high potency in this respect and cause a marked fall in blood cholesterol. The compounds of the invention are active upon oral administration but can also be given by the parenteral route, if desired.

The invention is illustrated by the following examples.

*Example 1*

At 0–5° C., 4.2 g. of trifluoroacetic acid anhydride in 5 ml. of ethyl acetate is added slowly to 6.2 g. of 2-[α-(o-chlorobenzimidoyl)benzyl]pyridine in 50 ml. of ethyl acetate containing 4.5 ml. of triethylamine. The mixture is allowed to stand at room temperature for three days, washed with water, with saturated sodium bicarbonate solution and with saturated sodium chloride solution, dried over magnesium sulfate, filtered and evaporated under reduced pressure to give crude N-[α-(o-chlorophenyl)-β-(2-pyridyl)phenethylidene]-trifluoroacetamide; M.P. 138–141° C. following crystallization from methanol.

By the foregoing general procedure, with the substitution of 4.7 g. of 2-[α-(o-methylbenzimidoyl)benzyl]-pyridine for the 2-[α-(o-chlorobenzimidoyl)benzyl]pyridine, the product obtained is N-[α-(o-methylphenyl)-β-(2-pyridyl)-phenethylidene]trifluoroacetamide; M.P. 141–143° C.

The starting materials can be obtained as follows. 23 g. of 2-benzylpyridine is added to a solution of phenyl-lithium (prepared from 2.1 g. of lithium and 23 g. of bromobenzene in 100 ml. of ether) and the mixture is heated under reflux for one-half hour. A solution of 16.5 g. of o-chlorobenzonitrile in 100 ml. of ether is added and the mixture is heated under reflux for three more hours, cooled, and stirred with 250 ml. of ice water. The ether solution is separated, dried, and evaporated under reduced pressure to give a residue of crude 2-[α-(o-chlorobenzimidoyl)benzyl]pyridine. For purification the product can be dissolved in ether, the solution chromatographed on alumina and the solid fractions recovered from the eluates; recrystallized from methanol, M.P. 86–88° C.

A solution of phenyllithium is prepared by adding a solution of 187 g. of bromobenzene in 500 ml. of anhydrous ether with vigorous stirring to 17 g. of lithium chips in 500 ml. of anhydrous ether. The mixture is maintained under reflux by regulating the rate of addition and is stirred for 30 minutes after the addition is complete. With continued stirring, a solution of 210 g. of 2-benzyl-pyridine in 500 ml. of anhydrous ether is added to the solution of phenyllithium at such a rate that the ether is maintained at reflux. The reaction mixture which now contains the lithium derivative of 2-benzylpyridine is stirred for one more hour and then a solution of 117 g. of o-methylbenzonitrile in 200 ml. of anhydrous ether is added. The mixture is heated under reflux for 12 hours, chilled, and stirred with 300 ml. of saturated aqueous ammonium chloride solution. The ether layer is separated, dried over anhydrous magnesium sulfate, and concentrated to give an oily residue of 2-[α-(o-methylbenz-imidoyl)benzyl]pyridine; B.P. 180–190° C. at 0.3 to 0.5 mm. For further purification, the compound can be crystallized from methanol; M.P. 76–80° C.

*Example 2*

A solution of 210 g. of 2-benzylpyridine in 500 ml. of ether is added under reflux to a solution of phenyllithium (prepared from 17 g. of lithium and 187 g. of bromobenzene in 1000 ml. of ether) and the reaction mixture is stirred for one hour after the addition is complete. A solution of 117 g. of o-methylbenzonitrile in 200 ml. of ether is slowly added under reflux and heating under reflux is continued for 12 hours. The resulting mixture which contains the lithium derivative of 2-[α-(o-methylbenz-imidoyl)benzyl]-pyridine is cooled in an ice bath and treated with 17 g. of trifluoroacetyl chloride. The mixture is stirred at 25° C. for one hour and diluted with 250 ml. of cold water. The ether layer is separated, washed with saturated sodium chloride solution, dried, filtered, and evaporated under reduced pressure to give crude N-[α-(o-methylphenyl)-β-(2-pyridyl)phenethyl-idene]trifluoroacetamide; M.P. 141–143° C. following crystallization from methanol.

By the substitution of 131 g. of o-ethylbenzonitrile for the o-methylbenzonitrile in the foregoing procedure, the product obtained is N-[α-(o-ethylphenyl)-β-(2-pyridyl) phenethylidene]trifluoroacetamide.

*Example 3*

At 0° C., 1 ml. of methanesulfonyl chloride is added to a solution of 2.1 g. of 2-[α-(o-chlorobenzimidoyl)-benzyl]pyridine in 15 ml. of dry pyridine. The mixture is allowed to stand at 4° C. for two days and then diluted with chloroform, washed with sodium bicarbonate solution and with sodium chloride solution, dried and evaporated under reduced pressure to give a residue of crude N-[α-(o-chlorophenyl)-β-(2-pyridyl)phenethylidene] methanesulfonamide; M.P. 147–149° C. following crystallization from petroleum ether and from methanol.

By the foregoing procedure, with the substitution of 2.4 g. of 2-[α-(o-bromobenzimidoyl)benzyl]pyridine for the 2-[α-(o-chlorobenzimidoyl)benzyl]pyridine, the product obtained is N-[α-(o-bromophenyl)-β-(2-pyridyl) phenethylidene]methanesulfonamide. The starting material is obtained as follows. A solution of 15.3 g. of di-ethylamine in 50 ml. of anhydrous ether is added to a solution of 49 g. of 23.7% n-butyllithium (in heptane) in 75 ml. of anhydrous ether. The mixture is stirred for 30 minutes and then a solution of 31.8 g. of 2-benzyl-pyridine in 50 ml. of ether is added with external cooling to maintain the temperature at about 25° C. Thirty minutes later, 32.7 g. of o-bromobenzonitrile in 50 ml. of ether is added and the mixture is stirred for 2½ days and decomposed by stirring with saturated ammonium chloride solution. The ether layer is separated, dried, and evaporated to give a residue of 2-[α-o-bromobenz-imidoyl)-benzyl]pyridine; M.P. 107–109° C. after crystallization from methanol.

*Example 4*

At 0–5° C., 2 ml. of methanesulfonyl chloride is added to a solution of 5.6 g. of 2-[α-(o-methylbenzimido-yl)-benzyl]pyridine in 15 ml. of dry pyridine. The mixture is maintained at 4° C. for 16 hours and then diluted with chloroform, washed with water, with sodium bicarbonate solution and with sodium chloride solution, dried, filtered, and evaporated. The residue consists of crude N-[α-(o-methylphenyl)-β-(2-pyridyl)phenethyl-idene]methanesulfonamide; M.P. 181–183° C. following crystallization from petroleum ether and from ethyl acetate-petroleum ether.

By the foregoing procedure, with the substitution of 6.1 g. of 2-[α-(o-isopropylbenzimidoyl)benzyl]pyridine for the 2-[α-(o-methylbenzimidoyl)benzyl]pyridine, the product obtained is N-[α-(o-isopropylphenyl)-β-(2-pyri-dyl)phenethylidene]-methanesulfonamide. The starting material is obtained as follows. With continued stirring, a solution of 22 g. of 2-benzylpyridine in 50 ml. of anhydrous ether is added to a solution of 12.5 g. of phenyl-lithium in 200 ml. of anhydrous ether at such a rate that the ether is maintained at reflux. The reaction mixture is stirred for one more hour and then a solution of 17.5 g. of o-isopropylbenzonitrile in 50 ml. of ether is added.

The mixture is heated under reflux for 12 hours, chilled, and stirred with 50 ml. of saturated aqueous ammonium chloride solution. The ether layer is separated, dried, and evaporated under reduced pressure to give a residue of crude 2-[α-(o-isopropylbenzimidoyl)benzyl]pyridine; M.P. 109–112° C. following crystallization from methanol.

I claim:
1. A compound of the formula

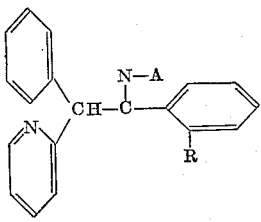

where R is a member of the class consisting of lower alkyl and halogen, and A is a member of the class consisting of trifluoroacetyl and methanesulfonyl.

2. N-[α-(o-methylphenyl) - β - (2 - pyridyl)phenethylidene]trifluoroacetamide.

3. N-[α-(o-chlorophenyl) - β - (2 - pyridyl)phenethylidene]trifluoroacetamide.

4. N-[α-(o-methylphenyl) - β - (2 - pyridyl)phenethylidene]methanesulfonamide.

5. N-[α-(o-chlorophenyl) - β - (2 - pyridyl)phenethylidene]methanesulfonamide.

No references cited.